Figure 1:
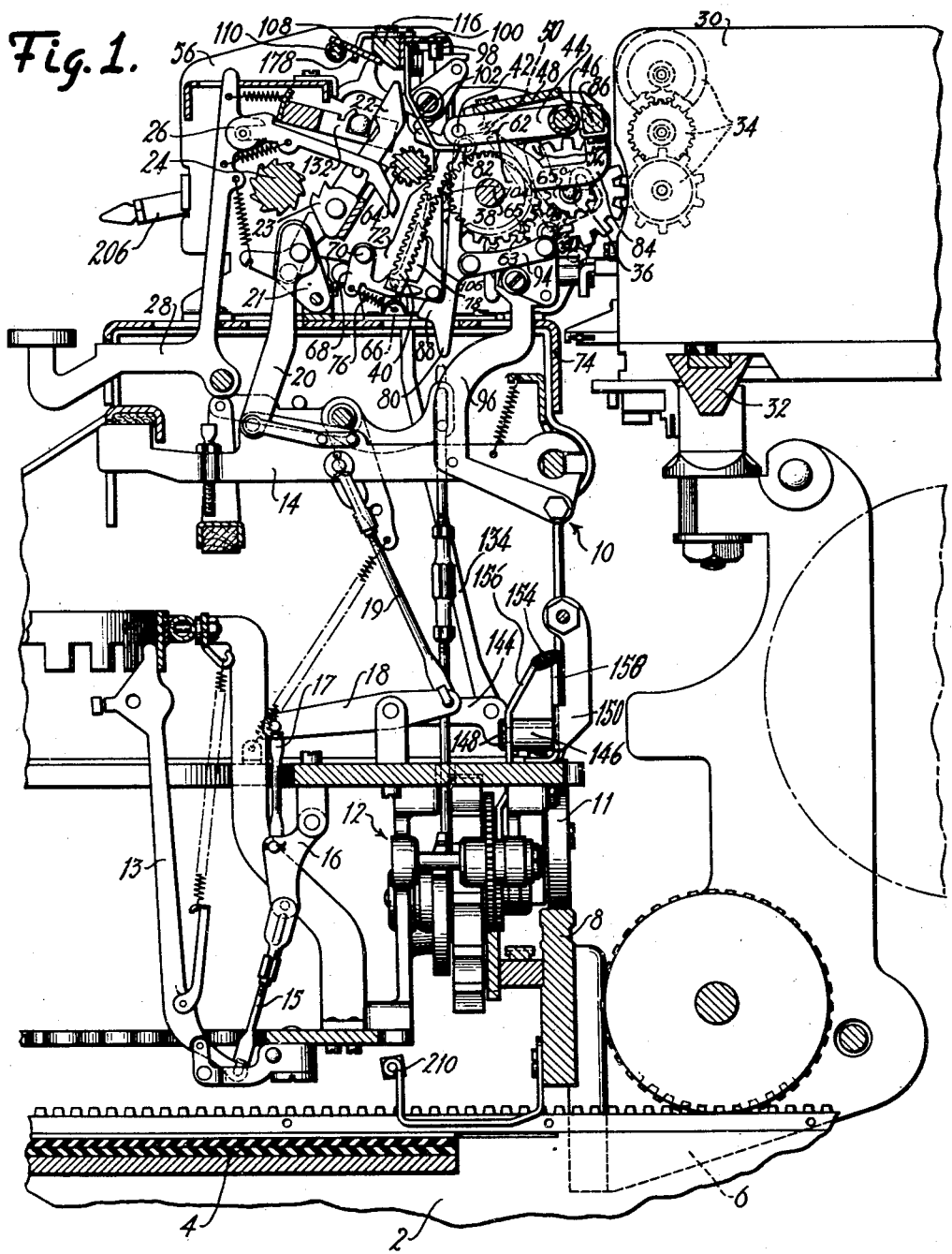

March 13, 1945.  O. J. SUNDSTRAND  2,371,558
TYPEWRITING AND ACCOUNTING MACHINE
Filed June 29, 1940  3 Sheets-Sheet 1

INVENTOR
OSCAR J. SUNDSTRAND
BY
ATTORNEY

March 13, 1945.   O. J. SUNDSTRAND   2,371,558
TYPEWRITING AND ACCOUNTING MACHINE
Filed June 29, 1940   3 Sheets-Sheet 2
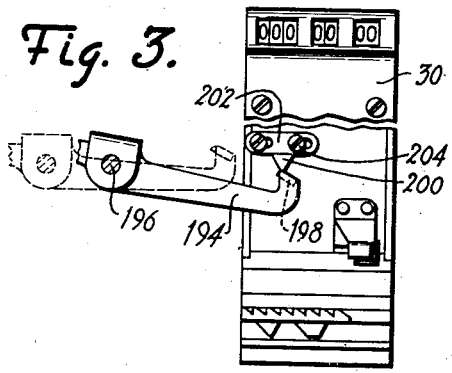
Fig. 3.
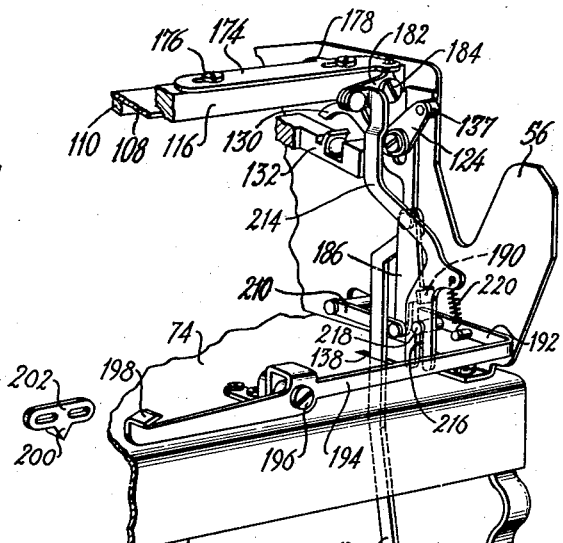
Fig. 2.
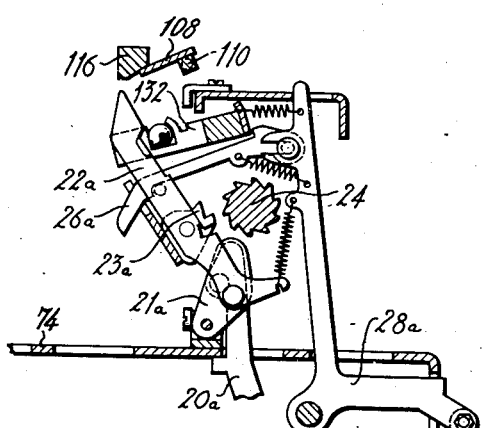
Fig. 4.
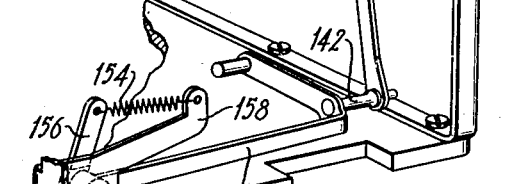
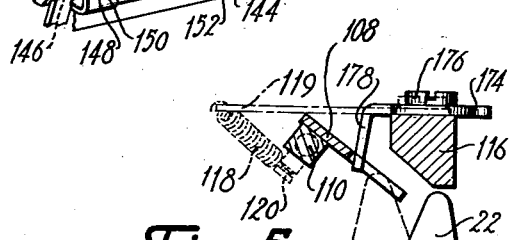
Fig. 5.
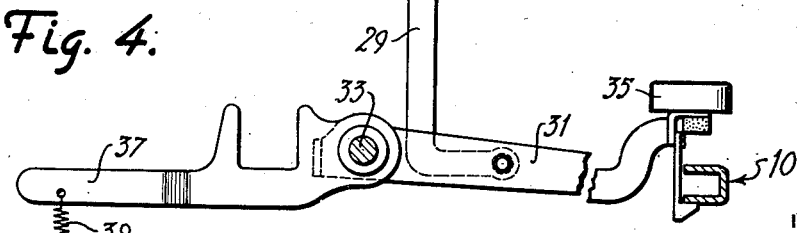
INVENTOR
OSCAR J. SUNDSTRAND
BY
ATTORNEY March 13, 1945.  O. J. SUNDSTRAND  2,371,558
TYPEWRITING AND ACCOUNTING MACHINE
Filed June 29, 1940   3 Sheets-Sheet 3
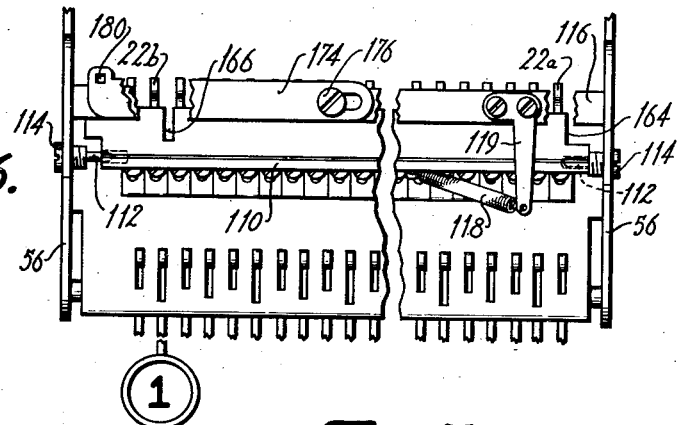
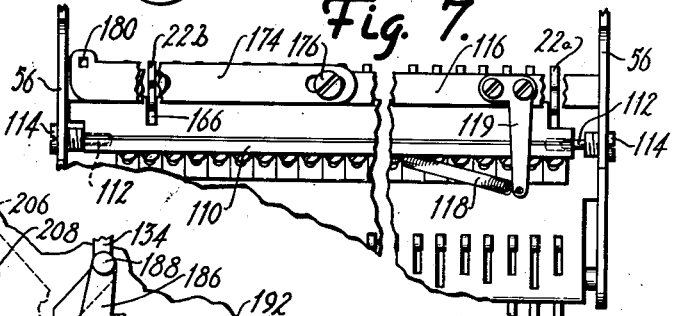
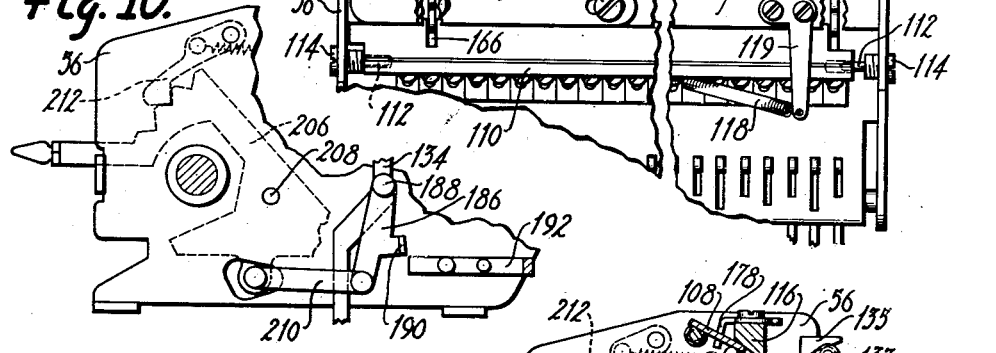
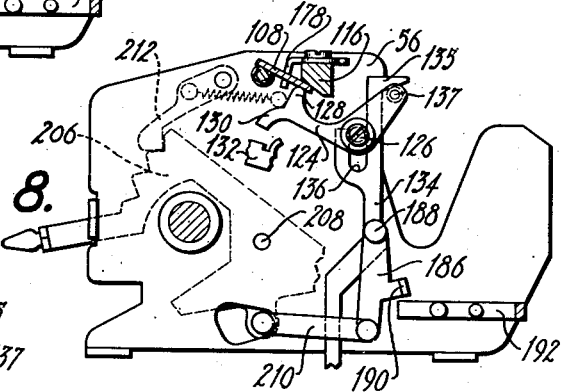
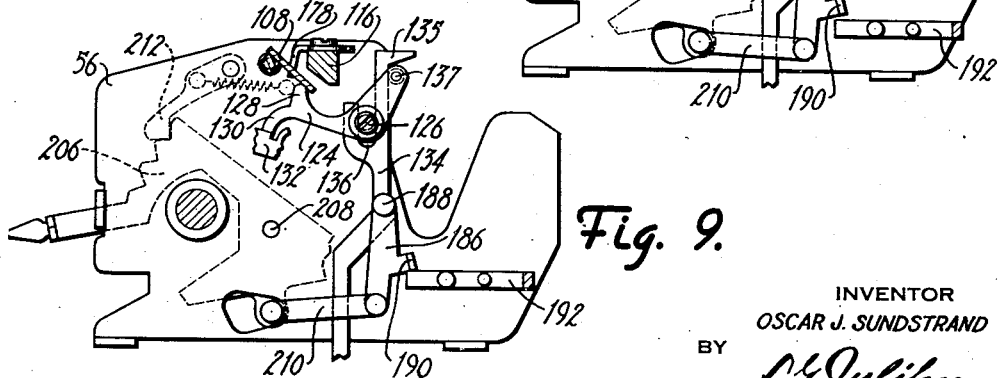
INVENTOR
OSCAR J. SUNDSTRAND
BY
R. G. Julihn
ATTORNEY Patented Mar. 13, 1945

2,371,558

UNITED STATES PATENT OFFICE 2,371,558

TYPEWRITING AND ACCOUNTING MACHINE

Oscar J. Sundstrand, West Hartford, Conn., assignor to Underwood Elliott Fisher Company, New York, N. Y., a corporation of Delaware Application June 29, 1940, Serial No. 343,232

4 Claims. (Cl. 235—130)

This invention relates to accounting machines and to combined typewriting and accounting machines of the classes in which numbers are entered digit by digit in a register. The invention is illustrated in this application as embodied in a typewriting and accounting machine of the Elliott Fisher type.

The invention is particularly designed as an improvement on accounting machines of the class described in which the register or registers are constructed and arranged to receive and compute amounts in English money. The invention, however, is not limited to English money machines but certain features thereof may be applied with advantage to other machines. The present machine comprises one or more registers and operating mechanism for driving the totalizing mechanisms of the registers which are relatively movable to transfer the driving or operating mechanism from denomination to denomination of the register.

In machines of this class, it is often desirable to lock all of the differential actuating mechanisms except a predetermined one of said mechanisms out of operation when the mechanism for driving the totalizer wheels of the register is in a predetermined denominational position with relation to the register. For example, in an English money machine, when the driving mechanism is in tens of shillings position with relation to the register, it is desirable to lock all the differential actuating mechanisms out of operation except that for the numeral 1, since this is the only number which can properly be entered in the register with the operating mechanism in this position. The entry of any other number in the register, with the parts in this relative position, will result in a misoperation.

One object of the present invention is to provide machines of the character above described with a novel and improved mechanism for locking all the differential actuator mechanisms out of operation except a predetermined one or predetermined ones of said mechanisms when the totalizer wheel operating mechanism is in a predetermined position with relation to a register.

Another object of the invention is to provide an English money machine of the class above referred to in which improved mechanism is provided for locking all the differential actuator mechanisms except that for the numeral 1 from operation when the totalizer wheel operating mechanism is in tens of shillings position with relation to a register.

With the above objects in view, the invention consists in a machine embodying the novel and improved features, constructions and combinations of parts hereinafter described and particularly pointed out in the claims, the advantages of which will be readily understood and appreciated by those skilled in the art.

The present machine is provided with power operated mechanism for driving the differential mechanisms to operate the totalizer wheels of the registers to enter numbers in the same, and the invention is illustrated as applied to such a machine.

The various features of the invention will be clearly understood from the accompanying drawings illustrating a machine embodying the invention in its preferred form and the following detailed description of the construction therein shown.

In the drawings—

Fig. 1 is a view in vertical section of the machine and illustrating particularly the type bar operating mechanism and the mechanism for operating the registers or totalizers to enter the numbers from "3" to "1" inclusive, therein, Fig. 2 is a detail perspective view illustrating particularly the locking mechanism for locking the differential actuators out of operation and the means for controlling the same, Fig. 3 is a detail view in front elevation illustrating one of the column registers and one of the cooperating parts illustrated in Fig. 2, Fig. 4 is a detail sectional view illustrating particularly certain parts of the space bar mechanism and the power means for operating the same, Fig. 5 is a detail view in vertical section illustrating certain parts of the locking mechanism, Fig. 6 is a detail plan view illustrating particularly the locking mechanism, the means for actuating and controlling the same and certain associated parts, Fig. 7 is a view similar to Fig. 6 illustrating certain of the parts in different positions, Fig. 8 is a view partly in side elevation and partly in vertical section illustrating the locking mechanism for locking the differential actuators out of operation, the state control lever and the connections for controlling the action of the locking mechanism from said lever, Fig. 9 is a view similar to Fig. 8 illustrating certain of the parts in different positions, and Fig. 10 is a view similar to Figs. 8 and 9, of a portion of the mechanisms shown in said figures, illustrating certain of the parts in still different positions.

The invention is illustrated in this application as embodied in a machine particularly constructed and arranged to receive and compute amounts in English money. This machine, except for the mechanism for locking the type bar mechanisms and differential actuator mechanisms out of operation under certain conditions, has substantially the same construction, arrangement and mode of operation of parts as the machine illustrated and described in applicant's application Serial No. 281,772, filed June 29, 1939. The differential mechanism, however, is constructed to enter amounts in English money in the register or registers.

In the illustrated construction, the machine comprises a platen frame provided with side rails or bars 2 connected together in spaced relation by cross bars (not shown) and a substantially flat platen 4 mounted for vertical movement in said frame. Upon the side rails of the platen frame is supported a line space frame movable forwardly and rearwardly on tracks formed upon the upper edges of said rails to line space the type carriage with relation to the platen. The line space frame comprises side brackets or bars, one of which is indicated at 6, connected by front and rear rails, of which the rear rail is indicated at 8.

Upon the line space frame is supported a type carriage or head indicated as a whole at 10 upon which are mounted the usual series of type bars, each carrying one or more types for engaging the work sheets supported on the platen. The type bars are arranged to be operated by power driven mechanism in the present machine and this mechanism is in part carried by the carriage. The carriage also carries the usual series of keys forming the keyboard of the machine and controlling the coaction of the type bars with the power driven mechanism. The carriage also carries a master wheel by which the totalizer wheels of the registers are driven and mechanism for driving the master wheel differentially by power to set up or enter successively the various digits of a number step by step in the register.

The type carriage is mounted for movement forwardly and rearwardly with the line space frame and is also mounted for lateral movement on said frame in a right hand direction to letter space during a typing operation and for return movement in a left hand direction to restore the carriage to position for starting the typing of a line. The carriage is provided with front and rear wheels or rollers arranged to engage respectively the front and rear rails of the line space frame. One of the rear rollers is indicated at 11 in Fig. 1. The carriage is acted upon by the usual metallic band having one end attached to the carriage and connected with the usual spring drum which tends yieldingly to move the carriage constantly in a right hand direction along the rails of the line space frame. These elements are not shown in this application but are illustrated and described in application Serial No. 281,772, referred to above. The letter spacing movement of the carriage is controlled by the usual escapement mechanism indicated at 12.

Each of the type bar mechanisms comprises a type lever 13, an intermediate lever 14 and a series of links and levers 15, 16, 17, 18 and 19 connecting the intermediate lever with the type bar through which the type bar is actuated to engage the type with the work sheet on the platen upon the downward movement of the intermediate lever. The power mechanism for actuating the intermediate lever comprises a longitudinally movable transmitting link 20, a radius arm 21, a longitudinally movable driving link 22, a pawl 23 movably mounted on said driving link and a continuously rotating toothed or fluted shaft 24 arranged to be engaged by said pawl. The driving link is swung laterally to engage the pawl with the fluted shaft by means of a drag link 26 connected with a key lever 28.

Fig. 4 of the drawings shows particularly the spacing mechanism controlled by the space bar which will be hereinafter referred to as the space bar mechanism. This space bar mechanism has substantially the same construction, arrangement and mode of operation of parts as the corresponding mechanism shown and described in applicant's Patent No. 2,239,023, dated April 22, 1941. In Fig. 4, the parts of the mechanism for producing and controlling the spacing action by power corresponding to the type bar mechanisms are indicated by corresponding reference numerals with the addition of "a." As shown in Fig. 4, the lever 28a corresponding to the lever 28 of the numeral and alphabet mechanisms, is connected by a link 29 with the yoke-shaped space bar lever 31 which is fixed to the shaft 33, and the space bar 35 is attached to the forward ends of the two spaced arms of this lever. To the shaft 33 is also fixed an arm 37 to which is connected a spring 39 for restoring the parts to normal positions after the depression and release of the space bar.

The machine illustrated is provided with a register 30 mounted at the rear of the machine upon a register bar 32 and provided with totalizer wheels 34.

The type carriage is provided with power driven mechanism for actuating the totalizer wheels of the column register to set up numbers in said wheels. This mechanism is controlled by the numeral keys of the typewriter keyboard. This mechanism comprises a master wheel 36 located at about the middle of the type carriage at the rear thereof and extending rearwardly from the carriage into position to engage the lowest set of wheels of the totalizer mechanism. The master wheel is fixed to a shaft journaled in the carriage and is connected by suitable gearing with the main differential actuator shaft 38 extending across the type carriage and journaled in suitable bearings supported on the frame of the carriage.

The shaft 38 is rotated differentially to impart differential movements to the master wheel 36 and to the totalizer wheels of a register to enter the desired numbers in the register by differential mechanisms selectively controlled from the several numeral keys of the type bar mechanisms. These differential mechanisms are selectively thrown into operation by the corresponding numeral type bar actuating mechanisms respectively. The said differential mechanisms have substantially the same construction, arrangement and mode of operation as the corresponding mechanisms shown and described in applicant's pending application, Serial No. 281,772. The several mechanisms for differentially rotating the shaft under control of the numeral keys for the numbers from "3" to "11" inclusive, to enter corresponding numbers in the register, all have the same general construction, arrangement and mode of operation of parts, these mechanisms differing only in the respects hereinafter pointed out to vary the rotative movement imparted to the shaft.

Each of these mechanisms (see Fig. 1) comprises a longitudinally movable rack bar 40, pivotally suspended at 42 on an arm 44 which is pivoted on a shaft 46 extending across the type carriage. These arms are acted upon by a bail 48 also pivoted on said shaft and normally held yieldingly in depressed position by a spring 50, the bail engaging the upper sides of the arms as shown in Fig. 1. The downward movement of the bail is adjustably limited by an adjustable stop lever 52 (see Fig. 1).

Each of the racks 40 is provided, on the rear side thereof, with a series of downwardly inclined teeth arranged to engage the teeth of a gear 62, fixed to the shaft 38, the teeth of the gear being inclined in a clockwise direction, Fig. 1. The shaft 38 is connected with the master wheel 36 to drive the same by suitable gearing such as the gears 63 and 65. Each of the rack bars is also provided on its forward side with a series of downwardly inclined teeth arranged to engage the teeth of a continuously rotating power driven toothed or fluted shaft 64 extending across the type carriage and journaled in bearings carried by the side plates 56.

Each of the rack bars is normally held in a position intermediate between the shaft 64 and the corresponding gear 62 as shown in Fig. 1 in which it is disengaged from both shaft and gear. The mechanism for holding each rack in this position comprises a pin 66 secured in the bar adjacent the lower end thereof and engaging in a recess in a lever 68 pivoted at 70 on an upright supporting plate or bracket 72 secured to the cover plate 74. This lever is acted upon by a coil spring 76 which tends to swing the lever upwardly and yieldingly holds the pin engaged in the recess with the pin in contact or substantially in contact with the lower edge of a fixed cam plate 78 attached to the upright plate 72.

In order to throw into operation the differential mechanism for entering a given digit in the totalizer wheels of a register, the rack bar 40 corresponding to this digit is swung forwardly to engage the teeth on the forward side of the rack bar with the teeth of the continuously rotating shaft 64. By the engagement of the rack bar with the shaft, the rack bar is moved longitudinally upward and the corresponding arm 44 and the bail 48 are swung upwardly by the movement of the rack bar against the action of the spring 50. When the rack bar has been moved upward the distance required for the subsequent action thereof, it is swung rearwardly to disengage the teeth on the forward side thereof from the shaft 64, this movement being limited to prevent the engagement of the teeth on the rear side thereof at this time with the gear 62. The rack bar is then moved longitudinally downward by the action of the bail 48 to a constant position, which is substantially the same for all of the several bars. At a predetermined point in the downward movement of the rack bar, the bar is swung farther to the rear to engage the teeth on the rear side of the bar with the gear 62, and, during the continued downward movement of the bar, the gear is rotated to actuate the totalizer wheels to enter the corresponding digit in the register.

The several mechanisms for swinging the rack bars forwardly to engage said bars selectively with the continuously rotating shaft 64 are operated from the several corresponding intermediate levers 14 connected with the numeral type bars as these levers are moved downward respectively to actuate the type bars corresponding to the numeral keys. These mechanisms, however, are rendered operative only when the master wheel 36 is in position to engage and actuate one of the wheels of the totalizer mechanism of a register. The position of the type carriage when the master wheel is in position to operate the totalizer wheels of a register, will be, in certain instances, hereinafter referred to as the position of the carriage, when in the zone of a register.

The mechanism for swinging each of the rack bars forwardly comprises a lever 80 (one for each rack bar) pivotally suspended at 82 upon an arm 84 secured to a rock shaft 86 extending across the type carriage and supported in bearings in the end plates thereof. The lever 80 projects at its lower end through a guide slot in the cover plate 74 and is formed on its left hand side with a projection 88 arranged to engage the pin 66. The rock shaft 86 is acted upon by a coil spring attached to an arm on said shaft (not shown) which normally maintains the arm 84 and the lever 80 in lowered position with the projection 88 below the pin 66. The lever 80 is connected by a link 94 with a plate fixed to the upper end of an arm 96 secured to one of the intermediate levers 14.

The levers 80, when the carriage is not in the zone of a register, occupy their lowered positions as shown in Fig. 1. The machine is provided with the usual state control device and register engaging cam mechanism for controlling the actuation of the totalizer wheels of a register from the differential mechanism when in the zone of a register, both of which are shown and described in applicant's application Serial No. 281,772. With the state control device adjusted in "write" or "total" positions, the levers 80 will occupy their normal lowered positions, when the carriage is in the zone of a register. With the state control device adjusted in "compute" position, when the carriage is in the zone of a register, the levers 80 assume elevated positions to locate the projections 88 opposite the pins 66.

With this construction, when the lever 14 of a numeral type bar mechanism is swung downwardly to actuate the type bar, the corresponding lever 80 is swung forwardly through its connection with the arm 96. If the lever 80 is, at this time, in lowered position, the projection 88 thereon will not engage the pin 66 and this movement of the lever 80 will not affect the position of the rack bar. However, if the lever 80 is then in elevated position, the projection 88 on the lever will engage the pin 66 on the rack bar, as said lever is swung forwardly, and the rack bar will be swung forwardly therewith to engage the same with the continuously rotating shaft 64.

When the rack bar is engaged with the shaft 64, the bar is moved upwardly by the action of the shaft for the distance required for its subsequent action and is then swung rearwardly to disengage the same from the shaft by means of a pin 98 projecting downwardly from a supporting plate 100 secured to the frame of the carriage, which pin engages a laterally projecting arm 102 on the rack bar.

During the lateral swinging movement of the rack bar forwardly to engage the same with the shaft 64, the pin 66 travels along the lower edge of the fixed cam plate 78 and then passes beyond said edge to locate the same forwardly of the plate. The upward movement of the rack bar produced by its engagement with the shaft 64 then carries the pin in front of the cam plate. During the upward movement of the rack bar, the pin travels along the forward edge of the cam plate which is shaped as shown in Fig. 1 and tends to guide the lower end of the rack bar and prevent it from disengaging the continuously rotating shaft. As the rack bar approaches the upper end of its movement, the upward movement of the rack carries the pin 66 beyond the upper end of the cam plate so that the pin leaves the forward edge of the cam plate and the rack bar is free to swing rearwardly. As the rack bar is swung rearwardly by the action of the pin 98, the pin 66 engages the forward side of a fixed guide plate 104 secured to the upright supporting plate 72 above the cam plate 78 and arranged to leave a crossover or channel 106 between the lower edge of the same and the upper edge of said cam plate. This plate 104 limits the rearward movement of the rack bar to prevent, at that time in the cycle, the engagement of the rack with the gear 62, and forms a guide for the lower end thereof during the first part of the downward movement of the bar.

During the first part of the downward movement of the rack bar, under the action of the bail 48, the pin 66 moves along the forward side of the guide plate 104 until it reaches the channel 106, the rack bar then being disengaged from the gear 62. As the pin reaches the channel, which occurs at a predetermined point in the downward movement of the rack bar, said pin is directed into said channel by the cam plate 78 which projects to the left some distance beyond the guide plate 104 as shown in Fig. 1. The channel 106 is inclined downwardly and to the right (Fig. 1) and, during the passage of the pin 66 through the same, the rack bar is swung rearwardly by the action of the cam plate 78, thereby engaging the rack bar with the gear 62 at a predetermined point in the downward movement of the rack bar.

During the continued downward movement of the bar under the action of the bail 48, the gear 62 is actuated to accumulate the number, corresponding to the numeral key depressed, in the number wheels of the totalizer mechanism of the column register. After the rack bar 40 is engaged with the gear 62, and the rack bar continues its downward movement, the pin 66 engages the rear edge of the cam plate 78 which forms a guide for the rack and, as substantially the end of the downward movement of the rack, the pin engages the projecting end of the lever 68. By the engagement of the pin with the lever, the lever is swung downwardly slightly and the pin is deflected forwardly into the recess in the lever by the contacting edge of the lever which is inclined to a slight degree to the direction of downward movement of the pin, thereby again locating the rack bar in its intermediate position.

The cam plate 78 and the guide plate 104 differ in size and contour for each of the several actuator racks. The position of the channel 106 or the position of the upper inclined edge of the cam plate 78 determines the point in the downward movement of the rack bar at which the rack bar is engaged with the gear 62 to actuate the totalized wheels of a register and this determines the extent of actuation of said wheels and the number which is entered therein.

The differential mechanisms for actuating the gears 62 corresponding to the actuator racks for the numeral keys 1 and 2, differs in certain respects from the corresponding mechanisms for actuating the gears 62 for the numeral keys for the numbers from "3" to "11," inclusive. These differential mechanisms also have substantially the same construction, arrangement and mode of operation as the corresponding mechanisms illustrated and described in said application Serial No. 281,772. In each of these mechanisms each rack 40 is disengaged from the fluted shaft 64 at a predetermined point in the upward movement of the rack, differing in the case of each rack, and the correponding gear 62 is actuated at the beginning of the downward movement of the rack. Thus, the differential movement of the respective racks is produced by disengaging the rack from the fluted shaft 64 with the racks in differential positions. In this case also, the upward movement of the racks is produced by the rotation of the fluted shaft 64 and the downward movement is produced by the downward movement of the bail under the influence of the bail actuating spring as in the case of the racks for entering the numbers from "3" to "11," inclusive.

The machine is provided with means for locking the type bar actuating mechanisms out of operation under various conditions to prevent misoperations of the machine. Since the differential mechanisms for actuating the totalizer wheels of the register are thrown into operation by the numeral type bar mechanisms, the locking of the type bar mechanisms out of operation will also lock out of operation the differential mechanisms.

The locking mechanism comprises a locking bail 108 consisting of a plate extending across the type carriage and arranged to be engaged by the upper ends of the driving links 22. This bail is mounted upon a bar 110 having bearing bores at its ends in which engage bearing pins 112 secured to screws 114 threaded into the side plates 56 of the machine head. The space between the inner ends of the screws 114 is sufficient to enable the locking bail to be moved longitudinally on the bearing pins 112 as shown in Figs. 6 and 7. The bail is normally held in its upper or unlocking position as shown in Fig. 1 in which it is not engaged by the upper ends of the driving links 22, when these links are swung forwardly by the depression of a key to throw the type bar operating mechanisms into operation, the upward movement of the bail being limited by its engagement with a stop bar 116 secured between the side plates 56 of the carriage. The bail is acted upon by an obliquely extending coiled spring 118 connected at one end with an arm on a bracket 119 secured to the bar 116, and at the other to a pin 120 projecting downwardly from the bar 110, which tends to swing the bail downwardly into locking position as shown in Figs. 5 and 9, in which its rear edge is located in position to be engaged by the upper ends of the driving links 22 to prevent these links from being swung forwardly into type bar actuating positions. With the bail in its normal longitudinal position, which it occupies at all times except under certain conditions when the driving mechanism for the totalizer wheels of the register is in tens of shillings position with relation to the register, and the bail is swung downwardly into locking position, the bail will then lie in position to engage all the driving links 22 of the alphabet and numeral type bar mechanisms. In this position, the locking bail will therefore lock all the type bar mechanisms and all the differential mechanisms out of operation.

The mechanism for controlling the position of the bail comprises a control lever 124 pivoted on a stud 126 secured in one of the side plates 56 of the frame of the carriage, said lever being arranged to engage the under side of the bail as shown in Figs. 1, 8 and 9. The lever is provided with a projection 130 for engagement with a stop 132 on the frame to limit the downward movement of the bail. The angular position of the lever 124 is controlled by a vertically movable control bar 134 formed with a slot 136 in which engages a stud 126 to guide the upper portion of the bar. The control bar 134 is formed at its upper end with a projection 135 having an inclined lower edge which is arranged to engage a roll 137 journaled on one arm of the control lever 124. The control bar extends through an opening 138 in the cover plate 74 of the machine head and the bar is supported at its lower end upon a stud 142 secured to one arm 144 of a three-armed lever 146 pivoted upon a stud 148 fixed in a bracket 150 secured to the deck plate 152 of the carriage frame. The lever 146 is acted upon by a coiled spring 154 connecting an arm 156 on said lever with an arm 158 on the bracket 150 which constantly tends to swing the lever in a clockwise direction, Fig. 2, and to draw the control bar downwardly.

The spring 154 normally holds the arm 144 of the lever 146 and the control bar 134 in depressed positions. With the control bar in depressed position, the engagement of the projection 135 of the bar with the roll 137 will hold the control lever 124 in the angular position shown in Figs. 1, 2 and 8, and the control lever will hold the locking bail 108 in elevated or unlocking position. Upon the elevation of the control bar 134, the upward movement of the projection 135 on the bar allows the control lever 124 to swing in a counterclockwise direction on the stud 126 into the position shown in Fig. 9 and the locking bail is then swung downwardly into locking position as shown in said figure by the action of the spring 118.

The control bar 134 is actuated to allow the locking bail to move downwardly into locking position under various conditions as shown and described in applicant's Patent No. 2,358,263, dated September 12, 1944, mechanism such as disclosed in said application being preferably provided for actuating and controlling the bar.

When the master wheel 36 is brought, by the movement of the type carriage, into the tens of shillings position with relation to the totalizer wheels of the register 30, the only digit which can properly be entered in the register and printed on the work sheet is "1." To prevent the differential actuators and type bar operating mechanisms for other numbers from being thrown into operation with the master wheel in this position and consequent misoperation of the machine, all of the driving links 22 for the number entering and type bar mechanisms except that for the number "1" mechanism are locked from forward movement sufficient to engage the corresponding pawls with the fluted shaft at this time by the locking bail 108. The driving link 22 for the space bar mechanism is also left unlocked at this time to enable letter spacing movement to be given to the carriage. For identification, the driving links respectively for the space bar and number "1" mechanisms are indicated at 22a and 22b. To this end the control bar 134 is moved upwardly upon the movement of master wheel 36 into tens of shillings position with relation to the register to allow the locking bail to move downwardly into locking position. With the locking bail in its normal longitudinal position, as shown in Fig. 6, the bail, when swung downwardly into locking position, locks the number "1" driving link 22b and the driving link 22a for the space bar mechanism out of operation. In order to enable the driving link for the number "1" mechanism and the driving link for the space bar mechanism to be swung forwardly into operating position at this time, the locking bail 108 is cut away at 164 and is provided with a slot 166. This cut away portion and slot are located longitudinally of the locking bail so that, when the bail is in its normal position as shown in Fig. 6, the cut away portion and slot are out of registration respectively with the link 22a for the space bar mechanism and the link 22b for the number "1" mechanism. When the master wheel 36 moves into the tens of shillings position with relation to the totalizer wheels of the register, the locking bail is moved longitudinally on the bearing pins 112 to locate the same in the position shown in Fig. 7. This movement of the locking bail brings the cut away portion 164 and the slot 166 into registration respectively with the driving links 22a and 22b for the space bar and number "1" mechanisms so that the location of the locking bail in locking position will not lock these driving links out of operation.

The obliquely extending spring 118 which acts longitudinally as well as transversely of the locking bail, normally maintains the locking bail in the longitudinal position shown in Fig. 6. The mechanism for moving the locking bail into the position shown in Fig. 7 comprises a slide 174 mounted for longitudinal movement on the bar 116 by means of screws 176 engaging in slots in the slide and threaded into the bar. This slide is formed with a finger 178 projecting downwardly from the slide and engaging in the slot 166. The slide is formed at one end with an opening 180 in which engages one arm of a bell crank lever 182 pivoted upon a screw stud 184 threaded into the bar 116.

Upon the movement of the master wheel 36 into tens of shilling position of a register, the control bar 134 is moved upwardly to allow the locking bail to swing downwardly into locking position and at the same time the bell crank lever 182 is swung in a clockwise direction (Fig. 2) to move the locking bail longitudinally from the position shown in Fig. 6 to the position shown in Fig. 7. The mechanism for moving the control bar 134 upwardly at this time comprises a lever 186 pivoted at 188 on the control bar 134 and provided with a laterally extending contact arm 190 arranged to be engaged by the forward end of an arm 192 of a lever 194 pivoted at 196 on a bracket secured to the cover plate 74. The lever 194 is provided with a rearwardly extending inclined contact projection 198 arranged to be engaged by a V-shaped cam projection 200 formed on a supporting plate 202 adjustably attached by means of screws 204 to the register 30, these screws engaging in slots in the plate 202.

When the master wheel 36 moves into tens of shillings position with relation to the totalizer wheels of a register, the projection 198 on the lever 194 is engaged by the cam projection 200 on the register and the lever is swung in a counter-clockwise direction (Fig. 2). The position of the projection 190 on the lever 186 with relation to the arm 192 on the lever 194 is controlled by a manually operable state control lever 206 having substantially the same construction and mode of operation as the corresponding lever shown and described in application Serial No. 281,772. This lever is pivoted at 208 on one of the side plates 56 and is connected with the lever 186 by means of a link 210. The lever 206 is held in "write," "total" or "compute" position respectively by the usual spring pressed detent lever 212.

When the state control lever 206 is located in "compute" position as shown in Fig. 8, the lever 186 is located in position to hold the projection 190 above the arm 192 of the lever 194 so that the projection will be engaged by said arm during the movement of the lever 194 produced as the master wheel 36 moves into tens of shillings position. The lever 186 and the control bar 134 will thereby be lifted to allow the locking bail to swing down into locking position.

In order to actuate the bell crank lever 182 at this time, a link 214 (see Fig. 2) is pivoted at its upper end to the horizontally extending arm of the bell crank and at its lower end is formed with a slot 216 in which engages a pin 218 secured in the arm 192 of the lever 194. The link 214 is yieldingly held in position with relation to the lever 194 by means of a spring 220 connecting the link with a pin secured in the lever, this spring normally holding the pin 218 engaged with the upper end of the slot 216.

With this construction, as the lever 194 is swung in a counter-clockwise direction (Fig. 2), upon the movement of the master wheel 36 into tens of shillings position in the register to allow the locking bail to swing down into locking position, the link 214 is raised by the pin 218 and the bell crank lever 182 is swung in a clockwise direction (Fig. 2) to move the locking bail 108 longitudinally from the position shown in Fig. 6 to the position shown in Fig. 7. With the locking bail in this position, the driving links 22 will all be locked against forward movement into operating position except the links 22a and 22b for the space bar mechanism and the number "1" mechanism respectively. Thus all of the type bar mechanisms and the differential actuator mechanisms except those for the number "1" mechanism are locked out of operation at this time. The type bar mechanism and the differential actuator mechanism for the number "1" mechanism and escapement actuating mechanism controlled from the space bar are free to be actuated at this time.

When the state control lever 206 is adjusted in "total" or "write" position, the lever 186 is positioned so that the projection 190 does not lie above the arm 192 on the lever 194 as shown in Fig. 10, and the lever 186 and the control bar 134 will not be raised to cause movement of the locking bail downwardly into locking position upon the movement of the master wheel 36 into tens of shillings position. Fig. 10 shows the state control lever in total position.

The vertical movements of the control bar 134 to cause the locking bail to move into and out of locking position produced by the angular movement of the lever 144 as shown and described in Patent No. 2,358,263, does not affect the position of the bell crank 182, and the locking bail is maintained in the longitudinal position shown in Fig. 6 during the movements of the bar.

It is to be noted that the locking bail, when in locking position, is arranged to lock all the alphabet type bar mechanisms out of operation so that a letter may not be typed.

Having explained the nature and object of the invention and having specifically described a construction embodying the invention in its preferred form, what is claimed is:

1. In a typewriting and accounting machine, having a register, means for driving differentially the register, and mechanism comprising a letter-spacing carriage for supporting the register and said driving means for relative movement to carry the driving means into and out of the register zone and to shift said driving means from denomination to denomination of the register; the combination with said carriage, of a series of selectively operable devices extending across the machine for causing the operation of the register by said driving means, a locking bail extending across the machine adjacent said devices and movable between unlocking position and two different locking positions and so constructed and arranged that, in one locking position of the bail, the bail will be located to be engaged by all said devices to lock the same from movement to cause the operation of the register by said driving means and that, in another locking position of the bail, the bail will be located to be engaged by certain of said devices to lock the same from movement to cause the operation of the register by said driving means and to leave one or more of said devices free to be given such movement, the bail being normally located in unlocking position, means for supporting the bail for shifting movement from unlocking position alternatively into the first locking position or into the second locking position and means controlled by the carriage for controlling the shifting of the bail into one of said locking positions.

2. In a machine of the class described, having a register, means for driving differentially the register, and mechanism comprising a letter-spacing carriage for supporting the register and said driving means for relative movement to carry the driving means into and out of the register zone and to shift said driving means from denomination to denomination of the register; the combination with said carriage, of a series of selectively operable devices extending across the machine for causing the operation of the register by said driving means, a locking bail extending across the machine adjacent said devices and movable between unlocking position and two different locking positions and so constructed and arranged that, in one locking position of the bail, the bail will be located to be engaged by all said devices to lock the same from movement to cause the operation of the register by said driving means and that, in another locking position of the bail, the bail will be located to be engaged by certain of said devices to lock the same from movement to cause the operation of the register by said driving means and to leave one or more of said devices free to be given such movement, the bail being normally located in unlocking position, means for supporting the bail for shifting movement from unlocking position alternatively into the first locking position or into the second locking position and means controlled by the carriage for shifting the bail into the latter position, as the carriage is shifted to locate the driving means in a predetermined denomination of the register.

3. In a typewriting and accounting machine, having a register, means for driving differentially the register, and mechanism comprising a letter-spacing carriage for supporting the register and said driving means for relative movement to carry the driving means into and out of the register zone and to shift said driving means from denomination to denomination of the register; the combination of a series of selectively operable devices extending across the machine for causing the operation of the register by said driving means, a locking bail extending across the machine adjacent said devices and arranged to be engaged by the same to lock the devices from movement to cause the operation of the register by said driving means, means for supporting the bail for longitudinal movement and for movement to shift a locking margin of the bail transversely of the length of the bail into and out of locking position with relation to said devices, the bail having a cutaway portion along said locking margin and means controlled by the carriage for moving the bail into locking position and for shifting the same lengthwise to locate said cutaway portion of the bail in registration with one or more of said devices to lock certain of said devices out of operation and to leave one or more of the same free to be operated.

4. In a machine of the class described, having a register, means for driving differentially the register, and mechanism comprising a letter-spacing carriage for supporting the register and said driving means for relative movement to carry the driving means into and out of the register zone and to shift said driving means from denomination to denomination of the register; the combination with said carriage, of a series of selectively operable devices extending across the machine for causing the operation of the register by said driving means, a longitudinally movable locking bail extending across the machine adjacent said devices and arranged to be engaged by the same to lock the devices from movement to cause the actuation of the register by said driving means, means for supporting the bail for pivotal movement to carry the same into and out of locking position, said bail being constructed to lock all of said devices when in one longitudinal position and to lock certain of said devices and to leave one or more of the same unlocked when in another longitudinal position and means controlled by the carriage for moving the bail into locking position and for shifting the same longitudinally to lock certain of said devices and to leave one or more of the devices free to be operated upon the movement of the carriage to locate the driving mechanism in a predetermined position with relation to the register.

OSCAR J. SUNDSTRAND.